Dec. 30, 1969 E. WINSTON ET AL 3,487,267

THERMALLY CONDUCTING TRANSISTOR SUPPORT ARMS

Filed Jan. 2, 1968

INVENTORS
ERIC WINSTON
MAQBOOL QURASHI
BY
Hopgood & Calimafde
ATTORNEYS

United States Patent Office 3,487,267
Patented Dec. 30, 1969

3,487,267

THERMALLY CONDUCTING TRANSISTOR SUPPORT ARMS

Eric Winston, Melrose Park, Pa., and Maqbool Qurashi, Pennsauken, N.J., assignors to Jerrold Electronics Corporation, Hatboro, Pa., a corporation of Delaware Filed Jan. 2, 1968, Ser. No. 694,961
Int. Cl. H02b *1/00*; H01b *7/34*
U.S. Cl. 317—100 6 Claims

ABSTRACT OF THE DISCLOSURE

A device reduces the temperature of enclosures containing electrical circuit components. Thermally conducting structural arms support transistor circuit elements within a circuit enclosure. The arms blanket the transistors and conduct heat generated thereby to the body of the enclosure where it is radiated to the outside.

BACKGROUND

The invention is in the field of sealed enclosures for electrical circuitry, and relates specifically to the removal of heat from such enclosures.

When electrical circuits are completely enclosed, as within airtight enclosures, heat generated by transistors and other circuit elements can cause the temperature within such enclosures to build up to destructively high levels. Without special provisions for its removal, the enclosure will eventually absorb this heat through radiation and connection activity within the enclosure, and radiate it to the surrounding atmosphere. However, in this event, the circuitry within the enclosure will reach temperatures much higher than that of the enclosure due to the inefficiency of the heat removing medium. Such high temperatures shorten the life of the circuit elements, and adversely effect the current carrying elements of the circuits as well as insulated components within the enclosure.

It is a primary objective of this invention to overcome the problem of high ambient temperatures within such enclosures by providing a direct heat conducting link between the heat producing circuit elements, notably transistors, and a radiating element exposed to the outside.

Another problem is created when enclosures containing circuit board elements are subjected to vibration and shock. Element of the circuitry may be shaken loose. It is therefore a further objective of this invention to provide structural support for these circuit elements, notably those which also produce the unwanted heat.

The invention solves these problems simultaneously by providing a heat conducting link between the circuit elements and the enclosure which also functions as a rigid shock resistant arm securely attaching them to the housing.

SUMMARY OF THE INVENTION

Briefly, the invention includes a thermally conducting member or arm, one end of which abuts a substantial area of a transistor, and the other a substantial area of the enclosure, so that ample heat conducting and radiating capacities are provided. The arm also structurally supports the transistor within the enclosure.

The support arm provides a conductive link between the hot circuit elements and allows the body of the enclosure to function as a heat sink. The arm conducts the heat from the transistors to the housing, preventing it from radiating into the atmosphere of the housing and raising its ambient temperature. The result is a cooler atmosphere within the housing, which promotes longevity of the circuitry. Since the support arms of the invention are conductive, they may also be used to provide an electrical ground for circuit elements.

The invention is advantageous in that it provides an efficient means of reducing the temperature within an enclosure with virtually no sacrifice of space and weight. The conducting arms lie within unused space ordinarily available within an enclosure, and may be made of cast aluminum or other light weight conductive metal.

The conductive arms fit into the walls of the circuit board retainer, forming virtually an integral part thereof, as well as the housing. This configuration offers an additional heat escape route, through the retainer and to the housing.

The arms of the invention, being relatively massive to enhance this conductivity, constitute a ready means for providing structural support for the transistor or other circuit elements they are cooling. When securely fastened to the enclosure and to their associated circuit elements, the arms add the quality of shock resistance to their other advantages.

Other objectives, advantages, and various further features of novelty and invention will be pointed out or will occur to those skilled in the art from a reading of the following specification in conjunction with the accompanying drawings.

DESCRIPTION OF PREFERRED EMBODIMENT

Figure 1:
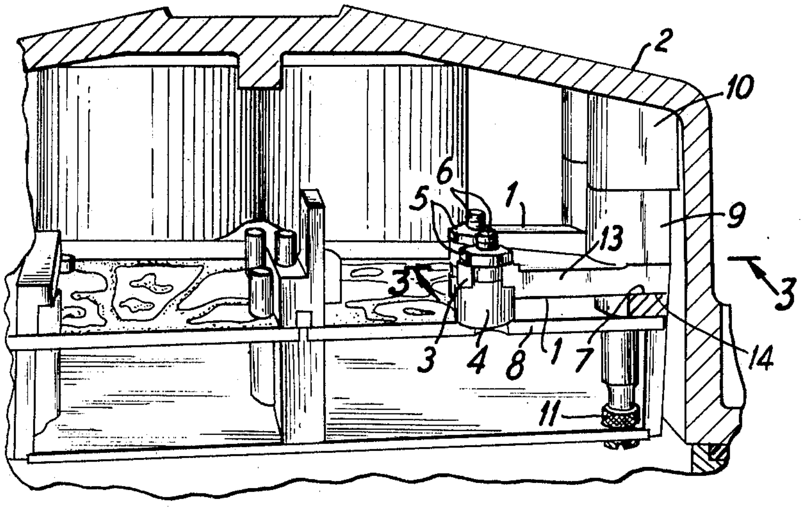
FIGURE 1 is a partial cut-away perspective view of the thermal support arms, associated circuit elements and their enclosure.

Referring now to FIGURE 1, the thermal support arms 1 are illustrated in position within the enclosure or housing 2. The inside end 3 of each arm 1 is molded to fit closely around the top of transistor element 4. The arm is held tightly about the transistor by the action of nut 5 which is threaded onto a stud 6 extending from transistor element 4. Since the enclosure 2 is ordinarily grounded, arm 1 may also serve as a ground contact, as it is electrically connected to the enclosure.

The outside end of the arm 1 terminates in a flat surface 7 which rests upon step 14 provided by the edge of the circuit board retainer, and a conducting extension 9 which lies adjacent a matching abutting section 10 of the enclosure. Section 10 is an integral part of an enclosure 2 and is joined to the top and side thereof by broad areas through which heat may escape. The area of contact between extension 9 and section 10 should be equal to or greater than the area of contact between the arm 1 and circuit element 4.

The outside end of each arm 1 is held tightly against section 10 of the enclosure by the action of screw 11 which abuts the bottom of foot 7 and screws into the receptacle 12 within section 10.

The inside and outside ends of arms 1 are joined by an integral bridge section 13 which is suspended above circuit board 8.

Figures 2, 3, 4:
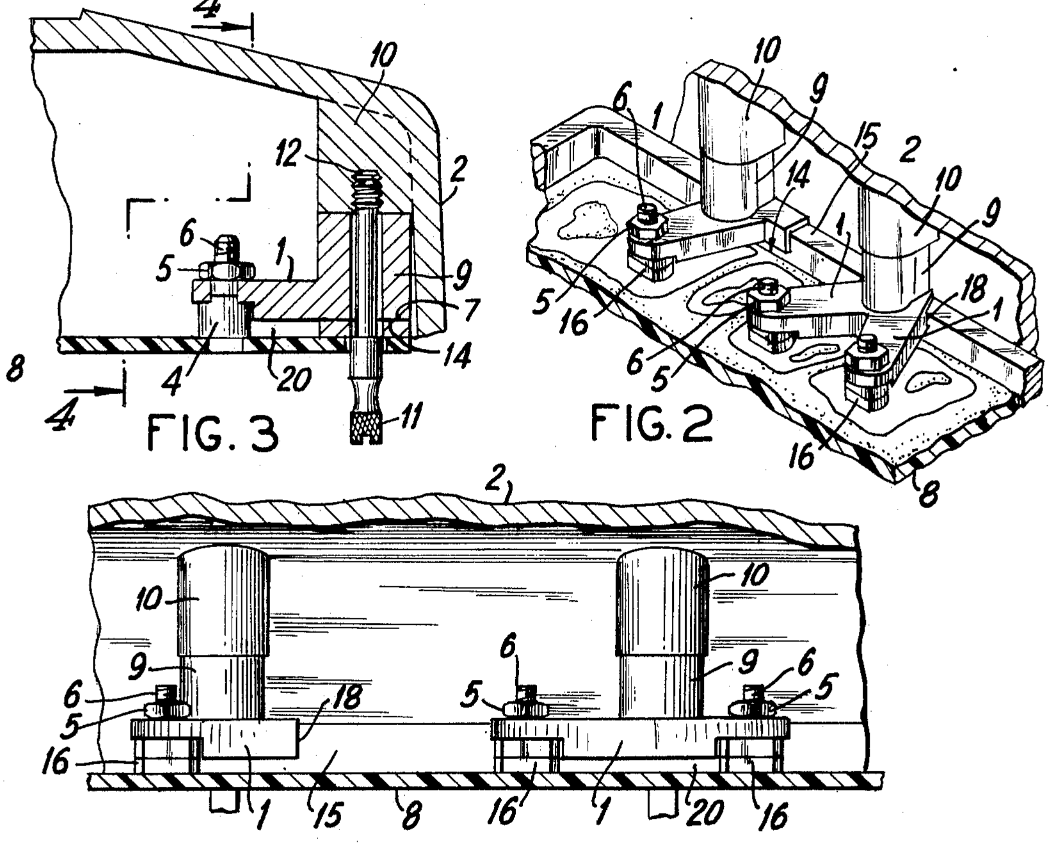
FIGURE 2 is a partial cut-away perspective view of the thermal support arms, the circuit board retainer and their enclosuure.
FIGURE 3 is a partial cut-away end view of a circuit board assembly taken along line 3—3 of FIGURE 1.
FIGURE 4 is a partial cut-away interior side view of the enclosure taken along line 4—4 of FIGURE 3.

FIGURE 2 illustrates an alternate configuration of the invention in which two arms feed a single conducting extension 9. Step 14 elevates the exterior end of the arms and maintains the space between bridge section 13 and the circuit board 8. In both configurations, illustrated by FIGURES 1 and 2, the exterior ends of the thermal arms fit into receses 18 in the circuit board retainer in such close relationship that the structure of the retainer provides an additional means of heat dissipation. The interior ends of the thermal arms illustrated in FIGURE 2 abut the top of circuit elements 16.

FIGURE 3 is a cross-sectional view of the configuration of the heat sink illustrated in FIGURE 1. Thermal arm 1 is illustrated abutting the top of transistor 4. It should be noted that the interior end of arm 1 illustrated in FIGURE 1 is slotted to permit lateral insertion of transistor 4 into the receiving section of arm 1. Screw 11 is illustrated in position passing through conducting extension 9 and into the threaded receptacle 12 in section 10 of the enclosure.

In this illustration, the path of heat from the transistor element to the exterior of enclosure 2 is made evident. The heat generated by circuit element 4 is conducted by arm 1, extension 9 and section 10 to the exterior surfaces of enclosure 2 where it is dissipated into the atmosphere.

FIGURE 4 is an interior perspective side view taken along line 4—4 of FIGURE 3. It illustrates the cylindrical configuration of elements 9 and 10. The cross-sectional area of elements 9 and 10 is determined by the conductivity of the materials of the enclosure and the thermal arms, and the amount of heat which they are expected to remove, in accordance with known principles of thermodynamics. FIGURE 4 further illustrates the space 20 between the arms 1 and circuit board 8. Space 20 should be sufficient to effectively eliminate thermal radiation from the arms 1 to the board 8.

The above described combination results in the formation of a heat sink, the purpose of which is to remove the heat generated by circuit elements 4 and 16. By providing a conductive path of low resistence between these elements and the exterior surfaces of the enclosure, the temperature of these elements and the ambient temperature within the enclosure are materially reduced, resulting in longer life and more reliabe performance of the circuitry therein.

While the principles of the invention have been described in connection with the above specific apparatus, it is to be clearly understood that this description is made only by way of example and not as a limitation to the scope of the invention as set forth in the accompanying claims.

What is claimed is:

1. In combination, an enclosure with removable modular electronic circuitry therein, and means to support and cool heat producing elements of said circuitry, comprising a thermally radiating outer housing, an electronic circuit board with circuit elements mounted thereon disposed within said housing, means to retain said circuit board within said housing, means to conduct heat from said circuit elements, and means to support said board and elements within said housing comprising at least one bridge-like thermal support arm having at least one inner end which blankets a preselected portion of at least one heat producing circuit element and is removably attached thereto in heat conducting relationship, and an outer end which overlaps said circuit board and circuit board retainer means, abutment means integral said housing to receive the outer end of said thermal support arm, means to removably attach said circuit board, said circuit board retainer means and said thermal support arm to said housing comprising, means to urge said overlapping board, retainer means and arm against said abutment means in heat conducting relationship, whereby the heat generated by the operation of said circuit elements is conducted by said arm to said retainer means and said outer housing.

2. The combination of claim 1 wherein said abutment means, said overlapping circuit board, said circuit board retaining means, and said at least one thermal support arm have a common bore therethrough, the bore within said abutment means being threaded, and wherein said means to urge said overlapping components against said abutment means is comprised of at least one bolt-like member passing through said common bore and into the threaded portion thereof in said abutment means.

3. The combination of claim 2 wherein said at least one thermal support arm is rigidly clamped between said abutment means and said circuit board retainer means.

4. The combination of claim 3 wherein said means to support said circuit board and heat producing elements thereon within said housing is comprised of a plurality of bridge-like fingers extending from a common outer end, each finger having an inner end attached to a heat producing electronic element on said circuit board, and wherein said outer terminal end is urged against said abutment means.

5. The combination of claim 4 wherein said circuit board retainer means has a recess therein sized to receive the outer end of said thermal support arm in closely fitting relationship.

6. The combination of claim 5 wherein said abutment means comprises a molded integral projection extending from the side and top of said enclosure, and having a face substantially parallel to the plane of said circuit board in heat conducting contact with the outer end of said thermal support arm, whereby heat generated by the supported circuit element is conducted to two outer surfaces of said enclosure.

References Cited

UNITED STATES PATENTS

| | | | |
|---|---|---|---|
| 2,994,203 | 8/1961 | Lackey et al. | |
| 3,157,828 | 11/1964 | Flaherty. | |
| 3,316,454 | 4/1967 | Donath et al. | 317—100 |
| 3,355,540 | 11/1967 | Newell | 174—15 |

LEWIS H. MYERS, Primary Examiner

G. P. TOLIN, Assistant Examiner

U.S. Cl. X.R.

174—15